(12) United States Patent
Baderspach et al.

(10) Patent No.: US 6,761,337 B2
(45) Date of Patent: Jul. 13, 2004

(54) FAST EVACUATION DEVICE FOR AIRCRAFT

(75) Inventors: Jérôme Baderspach, Toulouse (FR); Sébastien Rondot, Toulouse (FR); Christian Costecalde, Beauzelle (FR)

(73) Assignee: Airbus France, Toulouse Cedex (FR)

( * ) Notice: Subject to any disclaimer, the term of this patent is extended or adjusted under 35 U.S.C. 154(b) by 184 days.

(21) Appl. No.: 10/112,727

(22) Filed: Apr. 2, 2002

(65) Prior Publication Data

US 2002/0162916 A1 Nov. 7, 2002

(30) Foreign Application Priority Data

May 2, 2001 (FR) ............................................. 01 05867

(51) Int. Cl.$^7$ ................................................. B64C 9/00
(52) U.S. Cl. ..................... 244/905; 244/137.2
(58) Field of Search ............................ 244/905, 137.2; 182/48; 193/25 B, 25 C

(56) References Cited

U.S. PATENT DOCUMENTS

| | | |
|---|---|---|
| 2,765,131 A | 10/1956 | Boyle |
| 3,458,009 A | 7/1969 | Favors |
| 3,598,215 A | 8/1971 | MacLaughlin et al. ....... 193/25 |
| 3,852,854 A | * 12/1974 | Sigrud et al. |
| 4,106,729 A | * 8/1978 | Bergman et al. |
| 4,715,562 A | * 12/1987 | Bokalot |
| 4,723,628 A | * 2/1988 | Fisher |
| 4,746,765 A | * 5/1988 | Mallott |
| 6,457,677 B2 | * 10/2002 | Dazet et al. |

FOREIGN PATENT DOCUMENTS

| | | | |
|---|---|---|---|
| EP | 81845 | * 6/1983 | .................. 244/905 |
| EP | 0 518 461 A1 | 12/1992 | |

* cited by examiner

*Primary Examiner*—Tien Dinh
(74) *Attorney, Agent, or Firm*—Thelen Reid & Priest LLP

(57) ABSTRACT

Fast evacuation device for an aircraft.

An inflatable slide (18) is placed in a housing (20) close to an access door (16) to a cabin (14) of an aircraft. More precisely, the housing (20) is located in a pressurised area of the aircraft but outside the wall delimiting the cabin (14). Thus, there is no constraint for delimiting the housing (20) on the inside of the aircraft. On the outside, the housing (20) is closed by a hatch (24) capable of resisting the pressure. A lock (30) normally keeps the hatch (24) fixed in the closed position. A mechanism (32) connects this lock (30) to the door (16) when the slide arming system (33) is armed. Opening the door (16) then unlocks the hatch (24) that is then opened due to inflation of the slide (18).

10 Claims, 3 Drawing Sheets

FAST EVACUATION DEVICE FOR AIRCRAFT

TECHNICAL FIELD

The invention relates to a device designed to enable fast evacuation of passengers from an aircraft, if necessary, for example during an emergency landing.

A device conform with the invention can be used on any type of aircraft, and particularly on civil aircraft intended for passenger transport and military aircraft intended for troop transport.

STATE OF THE ART

Civilian passenger transport aircraft are equipped for fast evacuation of passengers if necessary, in other words particularly during an emergency landing.

It must be possible to make an emergency passenger evacuation without the use of any means external to the aircraft. When the aircraft doors are at a significant height above the ground, it is often proposed that evacuation should be made using slides.

In this case, the slides are made from flexible materials, so that they can be stored in the folded state onboard the aircraft. Inflatable side rings then apply the required shape and stiffness to the slides when they need to be used.

To enable fast use, each slide is stored in the folded state in the immediate vicinity of the exit at which it is to be used. Two different types of storage locations are used at the present time.

The most frequently used solution consists of storing the deflated and folded slide in the passenger cabin close to the exit, frequently left permanently in position against the door. An "arming" device fixes the slide to the door sill and triggers inflation of the slide as soon as the door is opened, if it is in the armed position. When this device is in the disarmed position, the arming device enables the door to be opened without the slide being inflated, so that passengers can get on and off under normal conditions.

Storage of slides in the passenger cabin has the disadvantage that it occupies a non-negligible space which correspondingly reduces the space available inside the passenger cabin and in some cases can hinder passengers and the crew.

Furthermore, when the slide is fitted on the door, it increases the weight of the door which makes its design and handling more complicated. Furthermore, this layout necessitates the presence of a complex disconnectable system for attachment of the slide to the exit door sill.

Another known solution consists of storing the folded slide in a housing located in an unpressurised area outside the passenger cabin. This type of housing may be located on the top of the wing so that it can be used with the emergency exits above the wing. As shown in document EP-A-0 518 461, the housing in which the folded slide is stored can also be formed under the passenger cabin, immediately below the door. This housing is rigid and airtight from the pressurised areas on the aircraft. There is an opening on the side of this housing facing the outside of the aircraft that is normally closed by a hatch enabling aerodynamic continuity of the fuselage.

This solution avoids problems due to the fact that the slide is installed on the inside of the passenger cabin. However, the slide cannot be stored in the wing if the exit is not close to the wing.

Furthermore, the installation of an unpressurised compartment in the fuselage, which is pressurised, is penalizing in terms of mass, particularly when the dimensions of the housing are large.

Furthermore, since the slide is located in an unpressurised area, it is subjected to severe pressure and temperature variations which require more preventive maintenance operations than when it is installed in a pressurised area.

PRESENTATION OF THE INVENTION

The purpose of the invention is precisely a device for fast evacuation of an aircraft, with an innovative design such that the space available inside the passenger cabin is not reduced and that the disadvantages caused by installing a slide in an unpressurised area.

According to the invention, this result is obtained using a fast aircraft evacuation device comprising a structure, one wall of which separates the device from a passenger cabin in which there is at least one opening with an access door to close the said opening, the fast evacuation device comprising a housing provided in the said structure close to the door, an inflatable slide placed in the housing, a hatch closing the housing on the outside of the aircraft, means of arming-disarming the slide and means of controlling automatic opening of the hatch when the door is opened if the arming-disarming means are in the armed state, characterised in that the housing is located in a pressurised area of the aircraft outside the wall delimiting the cabin.

In particular, placement of the slide in an area external to the passenger cabin eliminates the need to reduce the space available in the passenger cabin and simplify the door. Furthermore, because the housing containing the slide is located in a pressurised area, there are no other requirements for delimiting this housing on the inside of the aircraft. Thus, this delimitation can be made by a structure that is already present in the aircraft, or preferably by a protection compartment protecting the slide against various types of aggression, for example mechanical or chemical aggression. Since it is not subjected to forces generated by pressurization of the aircraft, this compartment has a lightweight structure, even when the slide itself is very large.

To take account of the fact that the slide is housed in a pressurised area in the aircraft, the hatch is capable of resisting the pressure differences during flight between the pressurised area and the outside of the aircraft.

For the same reason, air tightness means are inserted between the hatch and an outside skin of the aircraft.

In particular, these air tightness means include an inflatable seal.

Advantageously, means of controlling automatic opening of the hatch include means of locking the hatch in the closed position and a mechanism connecting the said locking means to the door through arming-disarming means when they are in their armed state. The mechanism is then separated from the door when the arming-disarming means are in a disarmed state.

According to a first embodiment of the invention called "with reactive locking", elastic means activate locking means in the direction to unlock the hatch, to open the hatch when the door is opened and act on the said mechanism through arming-disarming means when they are in their armed state.

Advantageously, the mechanism then comprises a rod capable of sliding along its axis and rotating about the said axis in an element of the aircraft structure, one end of the said rod acting on the locking means in opposition to the action of the elastic means. In this case, the mechanism also comprises stop means opposing sliding of the rod along its axis in the direction of the action of the elastic means when the rod is in a first angular position, and enabling the said sliding when the rod is in a second angular position. Furthermore, the arming-disarming means act on the rod to turn it about the said axis between the first angular position and the second angular position when the arming-disarming means change from their disarmed state to their armed state, and vice versa.

According to a second preferred embodiment of the invention called "with active locking", the locking means are inserted between the hatch and an element of the aircraft structure. The mechanism then acts on the hatch to move it between a first position in which the locking means are locked and a second position in which the locking means are unlocked when the mechanism is connected to the door through arming-disarming means.

In this case, the mechanism advantageously comprises a linkage that acts on the hatch through a link that can automatically be disconnected when the hatch is in its second position.

Preferably, a return means then acts on the linkage that normally keeps the hatch in its first position.

In the second embodiment of the invention, the hatch is typically put in a "cap" type configuration. The hatch is provided with stops for this purpose that can come into contact with complementary stops connected to a hatch frame structure under the action of pressure differences that exist in flight between the pressurised area and outside the aircraft when the hatch is in its first position

BRIEF DESCRIPTION OF THE DRAWINGS

We will now describe different embodiments of the invention for illustrative and non-limitative purposes, with reference to the attached drawings, in which.

DETAILED DESCRIPTION OF SEVERAL EMBODIMENTS OF THE INVENTION

Figure 1:
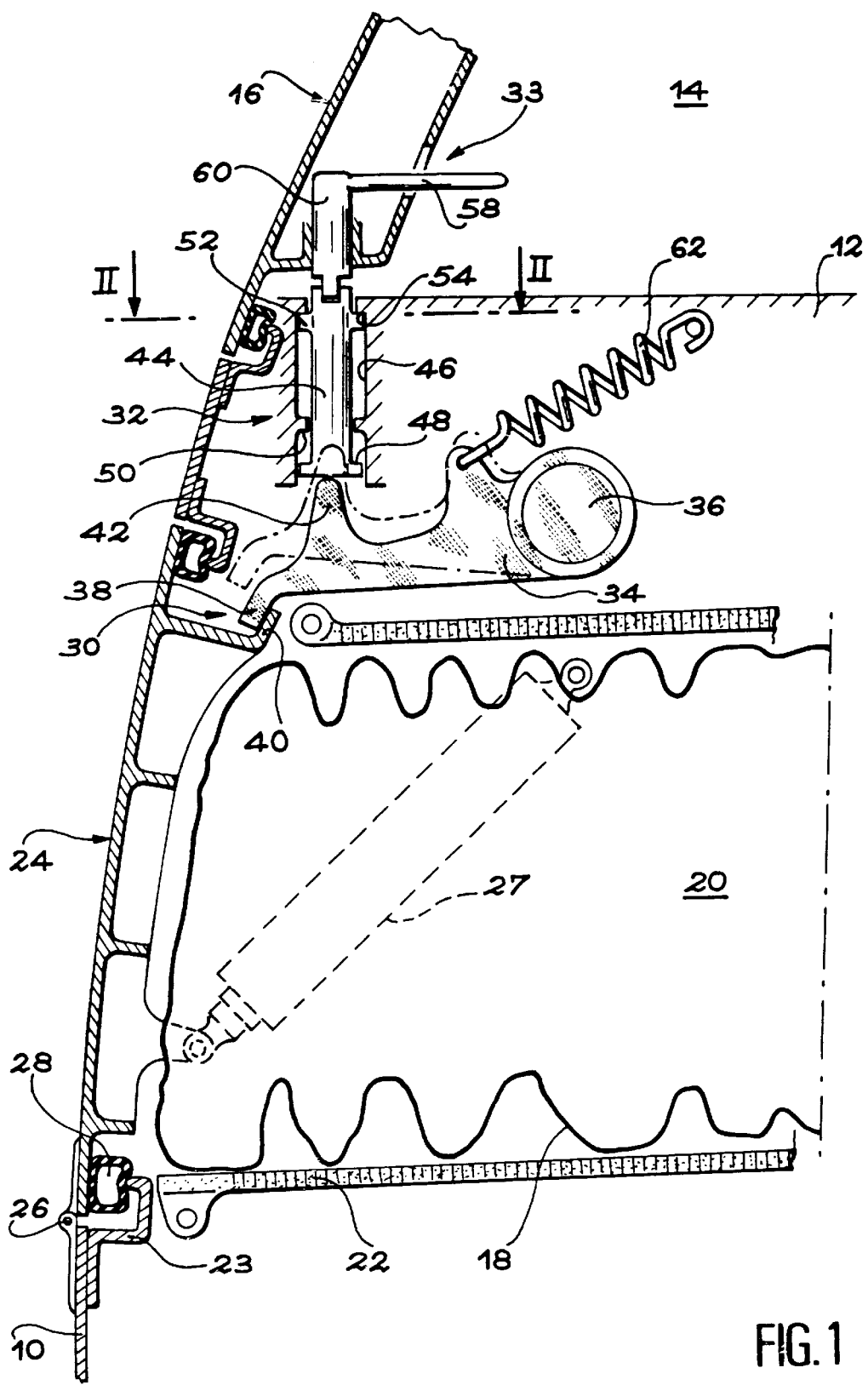
FIG. 1 is a cross-sectional view illustrating a first embodiment of a fast aircraft evacuation device according to the invention, including "reactive" means of locking the slide evacuation hatch.
Figure 2:
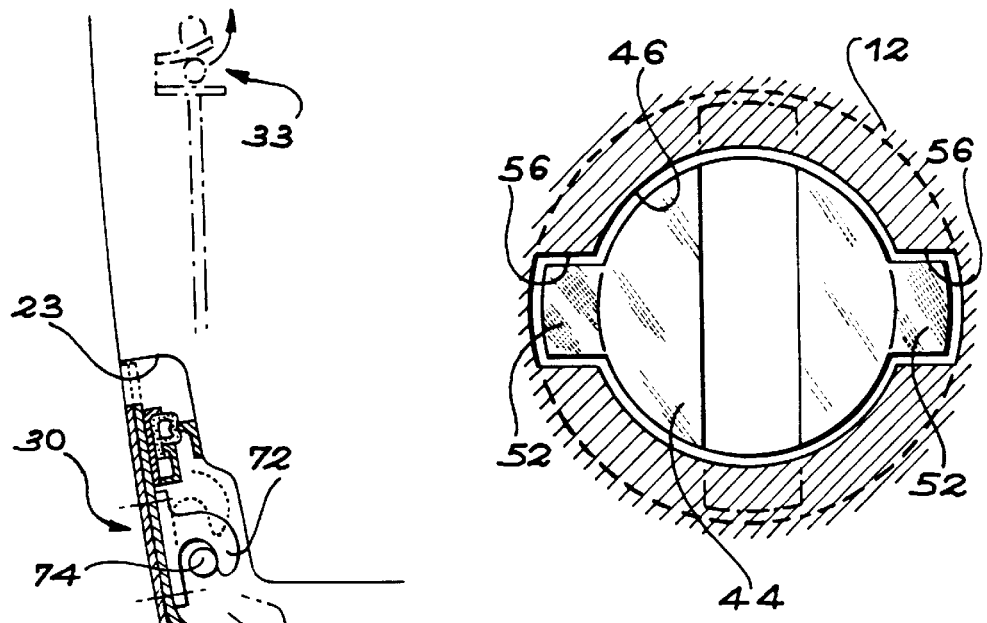
FIG. 2 is a sectional view along line II—II in FIG. 1.

We will now describe a first embodiment of a fast evacuation device according to the invention with reference to FIGS. 1 and 2.

FIG. 1 shows a cross-sectional view of a side part of the wall 10 of an aircraft fuselage, together with an adjacent part of the floor 12 of the pressurised passenger cabin 14. More precisely, the part of the wall 10 of the fuselage shown in FIG. 1 comprises an opening normally closed by an access door 16, but only the lower part of this access door is visible. Passengers use this opening to access the cabin when the aircraft is on the ground. It also forms an emergency exit if necessary. The wall 10 and the floor 12 both form part of the aircraft structure. They both form the wall delimiting the passenger cabin 14.

According to the invention, an inflatable slide 18 is stored in the deflated state in a housing 20 formed in a pressurised area of the aircraft outside the wall delimiting the cabin 14. The shape and size of the housing 20 are adapted to the shape and size of the slide 18.

In the embodiment illustrated in FIG. 1, the housing 20 is placed in the fuselage 10, below the floor 12 and the door 16. However as a variant, it could be located in any other location within the pressurised area and immediately adjacent to an exit.

Since the housing 20 is located in a pressurised area, there is no need for it to be delimited on the inside of the aircraft by thick bulkheads capable of resisting the high mechanical forces applied to parts separating pressurised areas from non-pressurised areas. Consequently, there is no need for the housing 20 to be delimited by a reinforced structure on the inside of the aircraft.

However, in the embodiment shown in FIG. 1, the housing 20 into which the slide 18 fits in the folded state, is delimited on the inside of the aircraft by a protection compartment 22 with a lightweight structure. The function of this compartment 22 is to protect the slide 18 from all types of aggression such as mechanical aggression, for example due to sharp edges or foreign bodies, and chemical aggression possibly caused by natural runoff, maintenance products, fumes, etc.

As diagrammatically illustrated in FIG. 1, the housing 20 is delimited at the outside of the aircraft by a hatch 24. Under normal conditions, the hatch 24 is closed and closes an opening provided in the wall 10 of the fuselage with a leaktight joint. This opening is delimited by a frame 23 and is located below the door 16, in the embodiment shown. The outside surface of the hatch 24 then controls the aerodynamic continuity of the aircraft fuselage. Furthermore, the hatch 24 is designed to resist the pressure differences that exist in flight between the housing 20 in the pressurised area and the outside of the aircraft.

The dimensions of the opening normally closed by the hatch 24 take account of the dimensions of the slide 18 that is to be deployed in the fuselage, and installation constraints related to other systems present inside the fuselage. As already observed, these constraints may make it necessary to put the housing 20 in a different location with regard to the access door 16, provided that the slide 18 can be deployed under the said door from this location.

The hatch 24 can be articulated on the wall 10 of the aircraft fuselage by hinges 26, as shown in FIG. 1. Any other articulation means such as a pantograph or other can also be used. As a variant, the hatch 24 can also be separated from the fuselage. The choice between these different solutions is made for each particular case, taking account in particular of criteria for deployment of the slide 18 and maintenance operations.

In the embodiment shown in FIG. 1, in which the hatch 24 is connected to the aircraft structure by hinges 26, one or several jacks 27, for example pneumatic jacks, may be provided to facilitate hatch movements.

When the hatch 24 is closed, air tightness means 28 such as an inflatable or non-inflatable seal limit pressurisation leaks towards the outside of the aircraft. More precisely, the seal 28 is inserted between the hatch 24 and its frame 23, connected to the aircraft structure.

The hatch 24 is normally kept in the closed position by locking means 30. A mechanism 32 connects these locking means 30 to the access door 16 though arming-disarming means 33 when these means 33 are in an "armed" state. On the other hand, the mechanism 32 is separated from the door 16 when these arming-disarming means 33 are in a "disarmed" state.

Conventionally, the arming-disarming means 33 are designed so that they can be operated by the crew from inside the cabin 14 when the access door 16 is closed.

Due to the layout described above, opening door 16 has the effect of unlocking the locking means 30 when the arming-disarming means 33 are in their armed state. Consequently, the hatch 24 opens automatically and releases the slide 18 under the action of the inflation means (not shown) associated with this slide, in the same way as in fast evacuation devices according to prior art. On the other hand, when the door 16 is opened while the arming-disarming means 33 are in their disarmed state, the hatch 24 remains locked in the closed position by the locking means 30.

In the embodiment shown in FIG. 1, the locking means 30 are of the "reactive" type. They are materialised by a lever 34 supported by an element of the aircraft structure adjacent to the upper edge of the frame 23 that delimits the opening closed by hatch 24.

More precisely, the lever 34 is installed on the said structural element through a pin 36, so that it can be pivoted about a geometric axis approximately parallel to the longitudinal axis of the aircraft. The lever 34 is fitted with a hook shaped end 38 folded downwards. This end 38 is normally connected to a hook 40 folded upwards and fixed to the hatch 24, to prevent the hatch pivoting towards the outside of the aircraft, in other words in the direction in which it opens. This position is shown in solid lines in FIG. 1, and corresponds to the locking position of the locking means 30.

The lever 34 also comprises a stop 42 facing upwards, close to its end 38. This stop 42 is in contact with the bottom end of a vertical rod 44 materializing the mechanism 32. The rod 44 is installed in a structural element of the aircraft, in this case materialised by the floor 12, so that it can rotate and slide along its axis inside a reaming 46 passing through the floor.

The upwards displacement of the rod 44 inside the reaming 46 is limited by two complementary shoulders 48 and 50 formed on each of these parts coming into contact with each other.

Furthermore, and as can be seen better in FIG. 2, the rod 44 carries at least one key 52 (two in the embodiment shown). The keys 52 are normally in contact with a shoulder 54 formed in the reaming 46, to oppose the rod 44 if it tends to move upwards from its down position in which it holds the lever 34 in the locked position.

As can be seen in FIG. 2, grooves 56 are formed in the reaming 46 parallel to its vertical axis, and open up on the shoulder 54. The number and layout of the grooves 56 are such that all keys 52 can simultaneously be brought into contact with the groove 56 by rotation of the rod 44 about its axis. The rod 44 can be moved upwards, and consequently locking means 30 can be unlocked.

The arming-disarming means 33 are materialised by a handle 58 fixed to a rod 60 with a vertical axis installed in the lower part of the door 16 so that it can rotate about the said axis. When the door 16 is closed, the rods 44 and 60 are aligned along the same vertical axis and are in contact with each other. Furthermore, the top end of the rod 44 and the bottom end of the rod 60 have complementary shapes, for example a "mortise and tenon" shape, such that the two rods 44 and 60 are connected to each other in rotation.

Due to the layout described above, when door 16 is closed, handle 58 can be moved to change the arming-disarming means 33 from an armed position to a disarmed position, and vice versa.

In the armed position, the angular orientation of the rods 44 and 60 about their common axis is such that the keys 52 fitted on the axis 44 are facing the grooves 56 formed in the reaming 46. The rod 44 is then free to move upwards when the door 16 is opened.

In the disarmed position, the angular orientation of the rods 44 and 60 about their common axis is such that the keys 52 are in contact with the shoulder 54 formed in the reaming 46. The rod 44 is then prevented from moving upwards regardless of the position of the door 16.

Finally, in the embodiment shown in FIGS. 1 and 2 in which the locking means 30 are of the reactive type, elastic means materialised by a tension spring 62 is inserted between the lever 34 and a structural element of the aircraft, in this case consisting of the floor 12 of the cabin 14.

When the aircraft door 16 is closed while the arming-disarming means 33 are in their disarmed position, the keys 52 of the axis 44 are in contact with the shoulder 54 formed in the reaming 46. Therefore, the axis 44 is kept in the down position when the door 16 is opened. This position thus makes it possible for passengers to get on and off without any risk of the hatch 24 opening since the lever 34 is held in the locked position by rod 44.

On the other hand, when the arming-disarming means 33 are in their armed state, the keys 52 are facing the grooves 56 formed in the reaming 46. In a known manner, the dynamic opening system of the door 16 is such that it moves firstly upwards and then approximately parallel to the wall 10 of the fuselage, before gradually moving away from it and exposing the opening formed in the wall. Due to this dynamic system, the rod 44 is released at the very beginning of the opening of the door 16. Consequently, the lever 34 moves upwards under the action of the tension spring 62. This has the effect of releasing the end 38 of the lever 44 from the hook 40. Inflation means (not shown) of the slide 18 then open the hatch 24 thus disengaged and deploy the slide on the outside of the aircraft, below the door 16.

Regardless of the position occupied by the arming-disarming means 33, it should be noted that when the door 16 is in the closed and locked position, it contributes to locking of the hatch 24 of the slide 18.

A second preferred embodiment of the invention will now be described with reference to FIGS. 3 and 4.

This embodiment is distinguished from the previous embodiment mainly by the fact that the locking means 30 in it are "active" and not "reactive". This means that in this case, the opening movement of the door 16 directly controls unlocking of the locking means 30 of the hatch 24. In other words, there is no need to provide elastic means comparable to the tension spring 62 in FIG. 1 to control unlocking of the hatch.

Another important difference between the first and second embodiments of the invention is related to the fact that the hatch 24 of the slide is of the "cap" type in the second embodiment. In other words, the hatch 24 comprises stops 64, the frame 23 comprises stops 66 and these stops 64 and 66 are in mutual contact when hatch is closed, the stops 64 in the hatch being located towards the inside of the aircraft from stops 66. Thus, the pressure difference during flight between the pressurised inside of the fuselage in which the housing 20 is located, and the outside of the aircraft, tends to force the stops 64 and 66 into contact with each other.

Figure 3:
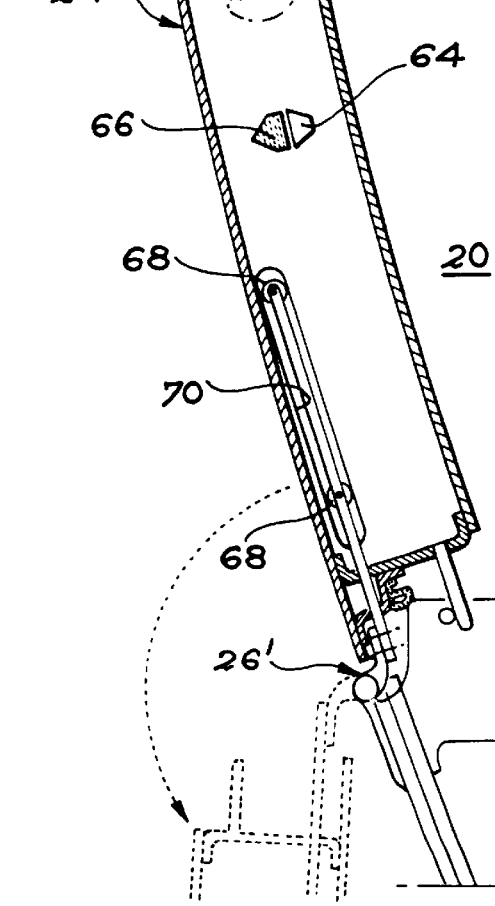
FIG. 3 is a view similar to FIG. 1, illustrating a second preferred embodiment of a fast evacuation device according to the invention, including "active" means of locking the hatch.
Figure 4:
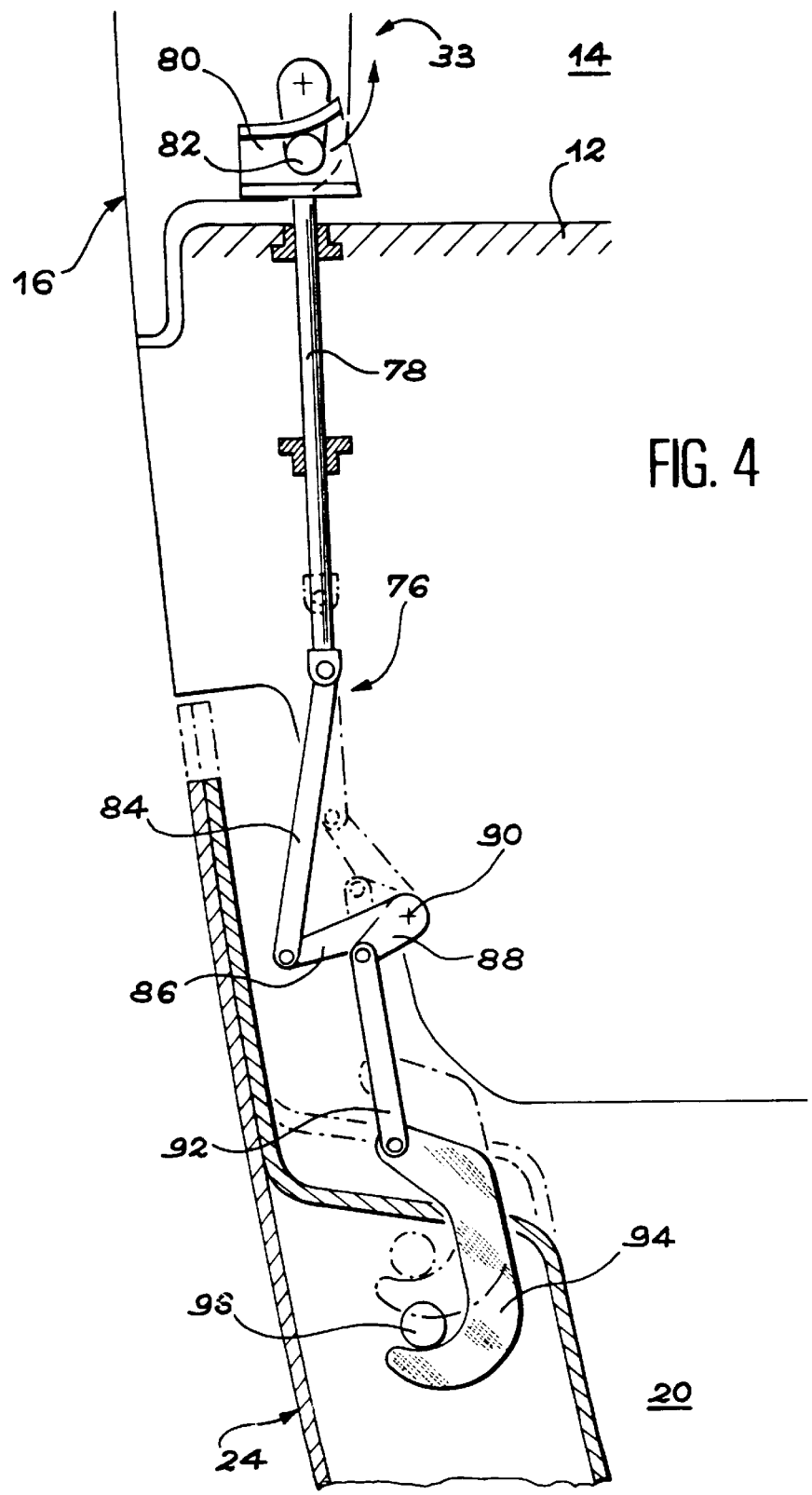
FIG. 4 is a cross-sectional view illustrating complementary elements of the device in FIG. 3.

In the embodiment illustrated in FIGS. 3 and 4, the hatch 24 is articulated on the bottom of the frame 23 by sliding hinges 26'. Furthermore, since they enable pivoting of the hatch 24 about an axis approximately parallel to the longitudinal axis of the aircraft, the sliding hinges 26' enable upwards displacement of the hatch 24 starting from its down locked position shown in solid lines in FIG. 3.

Consequently, the arm of the hinge 26' on which the hatch 24 is fixed, is provided with rollers 68 that fit into a guide groove 70 formed in the hatch. Obviously, any other mechanism known to a man skilled in the art that could achieve this double pivoting and sliding movement could be used without departing from the scope of the invention.

As shown in FIG. 3, the locking means 30 in this case comprise at least one locking hook 72 fixed to the hatch 24 and one or several rollers 74 fixed to the frame 23. The locking hooks 72 open downwards in order to cover the rollers 74 when the hatch 24 is in its locked down position. The locking hooks 72 and the stops 64 and 66 then prevent the hatch 24 from opening.

FIG. 4 shows one of the possible embodiments of a lifting mechanism 76, in this case joining hatch 24 to the door 16 through arming-disarming means 33 when they are in their armed state.

In this case, the lifting mechanism 76 comprises a rod 78 supported by a structural element of the aircraft such as the floor 12 of the cabin 14, free to slide along an approximately vertical direction. At its top end, the rod 78 is fitted with a slide 80 oriented along an approximately horizontal direction.

The slide 80 can be fitted with a mobile pin 82 (for example a sliding pin) mechanically connected to the door 16. The mobile pin 82 is directly controlled by the arming-disarming means 33 fitted on the door 16. Thus, when the means 33 are in their armed state, the pin 82 fits into the slide 80. The rod 78 is then connected to the door in translation when the door moves vertically. On the other hand, when the arming-disarming means 33 are in their disarmed state, the pin 82 is outside the slide 80 and there is no connection between the door 16 and the rod 78.

At its bottom end, the rod 78 is articulated to the top end of a first connecting rod 84, the bottom end of which is itself articulated on a first lever 86. This first lever 86 is fixed to a second lever 88 and both are fitted free to pivot on a structural element of the aircraft, such as the floor 12 of the cabin 14, about an axis 90 approximately parallel to the plane of the floor 12. A second connecting rod 92 is also articulated to the second lever 88 through its top end. Finally, the bottom end of the second connecting rod 92 is fitted with a lifting hook 94 at its bottom end. This lifting hook 94 is normally placed below a horizontal roller 96 fixed to the hatch 24, when the hatch is in the down position as illustrated in solid lines in FIG. 4.

Elements 78, 84, 86, 88 and 92 form a linkage connecting the slide 80 to the hook 94. Furthermore, the lifting hook 94 and the roller 96 form a connection between this linkage and the hatch 24. This connection can be automatically disconnected when the hatch 24 is in the up position.

In the layout that has just been described, when the arming-disarming means 33 are in the armed state, the door 16 is moved upwards at the beginning of its opening with the effect of also simultaneously moving the hatch 24 upwards.

When the door 16 is moved upwards, the assembly consisting of the connecting rods 84 and 92 and levers 86 and 88 reduces the movement amplitude transmitted to the lifting hook 94 by the rod 78. More precisely, in the embodiment shown in which the lever 86 is twice as long as lever 88, the lifting hook 94 moves along a distance equal to half of the displacement of the rod 78. Consequently, the upwards displacement of the door 16 is twice the upwards displacement of the hatch 24.

Obviously, this is simply one example embodiment of the scope of the invention and is in no way restrictive. More generally, the ratio between the displacements of the door 16 and the hatch 24 may be arbitrary, and particularly may be equal to 1. If they are equal to 1, the rod 78 acts directly on the lifting hook 94 through its bottom end.

The upwards movement of the hatch 24 resulting from the door 16 opening when the pin 82 is located in slide 80 (armed state) has the effect of disengaging the locking hooks 72 from the rollers 74 (FIG. 3) and separating the stops 64 from stops 66. Consequently, the hatch 24 then opens automatically, particularly due to inflation of the slide. Note that the hatch can also be opened due to the fact that the lifting hook 94, one end of which is located under the roller 96, is opened in the direction of the hatch opening movement. The slide is then deployed under the door 16 to enable emergency evacuation of passengers.

When the pin 82 is outside the slide 80 (disarmed state), opening the door 16 has no effect on the hatch 24. Therefore, the hatch remains in its down position illustrated in solid lines in FIGS. 3 and 4, in which the hatch remains locked by the locking hooks 72, in contact with the rollers 74.

The second embodiment of the invention that has just been described with reference to FIGS. 3 and 4 is preferred to the first embodiment because it provides a means of directly controlling positive locking of the slide hatch by manoeuvring the access door to the cabin without the need for an associated elastic means such as a spring.

Obviously, the invention is not restricted to the embodiments that have just been described as examples. Thus, and simply as an example, in the second embodiment described with reference to FIGS. 3 and 4, the assembly consisting of the lifting hook 94 and the roller 96 may be replaced by any other mechanism by which the hatch 24 can be lifted with the door 16 when the arming-disarming means 33 are disarmed, without subsequently opposing opening of the hatch and the door. Furthermore, a weak spring may act on the rod 78 to keep it in the down position under normal opening conditions of the door 16.

What is claimed is:

1. Fast aircraft evacuation device comprising a structure with one wall that delimits a passenger cabin, said wall comprising an inner wall portion and a fuselage wall portion, at least one opening formed in said fuselage wall portion and an access door that can close the said opening, the fast evacuation device comprising a housing provided in the said structure close to the door, an inflatable slide placed in the housing, a hatch closing the housing on the outside of the aircraft, means of arming-disarming the slide and means for controlling automatic opening of the hatch when the door is opened when the arming-disarming means are in the armed state, characterised in that the housing is located in a pressurised area inside the aircraft, said pressurized area being separated from the cabin by said inner wall portion.

2. Fast evacuation device according to claim 1, in which the housing is delimited on the inside of the aircraft by a protection compartment capable of resisting mechanical or chemical aggression.

3. Fast evacuation device according to claim 1, in which the hatch is capable of resisting pressure differences in flight between the pressurised volume and the outside of the aircraft.

4. Fast evacuation device according to claim 1, in which leak tightness means are inserted between the hatch and an external skin of the aircraft.

5. Fast evacuation device according to claim 4, in which the leak tightness means comprise an inflatable seal.

6. Fast evacuation device according to claim 1, in which the means of controlling automatic opening of the hatch comprise means of locking the hatch in the closed position and a mechanism connecting the said locking means to the door through arming-disarming means when the arming-disarming means are in their armed state, the said mechanism being separated from the door when the arming-disarming means are in a disarmed state.

7. Fast evacuation device according to claim 6, in which the locking means are inserted between the hatch and a structural element of the aircraft, the said mechanism acting on the hatch so as to move said hatch between a first position in which the locking means are locked and a second position in which the locking means are unlocked, when the mechanism is connected to the door through arming-disarming means.

8. Fast evacuation device according to claim 7, in which the hatch comprises stops that come into contact with complementary stops connected to a frame structure of the hatch, under the action of the pressure differences that exist in flight between the pressurised volume and outside the aircraft when the hatch is in its first position.

9. Fast aircraft evacuation device comprising a structure with one wall that delimits a passenger cabin, said wall comprising an inner wall portion and a fuselage wall portion, at least one opening formed in said fuselage wall portion and an access door that can close the said opening, the fast evacuation device comprising a housing provided in the said structure close to the door, an inflatable slide placed in the housing, a hatch closing the housing on the outside of the aircraft, means of arming-disarming the slide and means for controlling automatic opening of the hatch when the door is opened when the arming-disarming means are in the armed state, characterised in that a) the housing is located in a pressurised area inside the aircraft, said pressurized area being separated from the cabin by said inner wall portion;

b) the means of controlling automatic opening of the hatch comprise means of locking the hatch in the closed position and a mechanism connecting the said locking means to the door through arming-disarming means when the arming-disarming means are in their armed state, the said mechanism being separated from the door when the arming-disarming means are in a disarmed state; and, c) elastic means apply forces to the locking means in the direction to unlock the hatch so that the hatch can be opened when the door is opened, and acting on the said mechanism through the arming-disarming means when these means are in their armed state.

10. Fast aircraft evacuation device comprising a structure with one wall that delimits a passenger cabin said wall comprising an inner wall portion and a fuselage wall portion, at least one opening formed in said fuselage wall portion and an access door that can close the said opening, the fast evacuation device comprising a housing provided in the said structure close to the door, an inflatable slide placed in the housing, a hatch closing the housing on the outside of the aircraft, means of arming-disarming the slide and means for controlling automatic opening of the hatch when the door is opened when the arming-disarming means are in the armed state, characterised in that a) the housing is located in a pressurised area inside the aircraft, said pressurized area being separated from the cabin by said inner wall portion;

b) the means of controlling automatic opening of the hatch comprise means of locking the hatch in the closed position and a mechanism connecting the said locking means to the door through arming-disarming means when the arming-disarming means are in their armed state, the said mechanism being separated from the door when the arming-disarming means are in a disarmed state;

c) elastic means apply forces to the locking means in the direction to unlock the hatch so that the hatch can be opened when the door is opened, and acting on the said mechanism through the arming-disarming means when these means are in their armed state; and, d) said mechanism comprises a rod capable of sliding along its axis and rotating about the said axis in a structural element of the aircraft, one end of the said rod acting on the locking means opposing action of the elastic means, the mechanism also comprising stop means opposing sliding of the rod along its axis along the direction of action of the elastic means when the rod is in a first angular position, and enabling the said sliding when the rod is in a second angular position, the arming-disarming means acting on the rod to make it rotate about the said axis between the first angular position and the second angular position when the arming-disarming means change from their disarmed state to their armed state, and vice versa.

* * * * *